(No Model.) 3 Sheets—Sheet 1.
F. N. CONNET.
BELT SHIFTER.
No. 551,365. Patented Dec. 17, 1895.
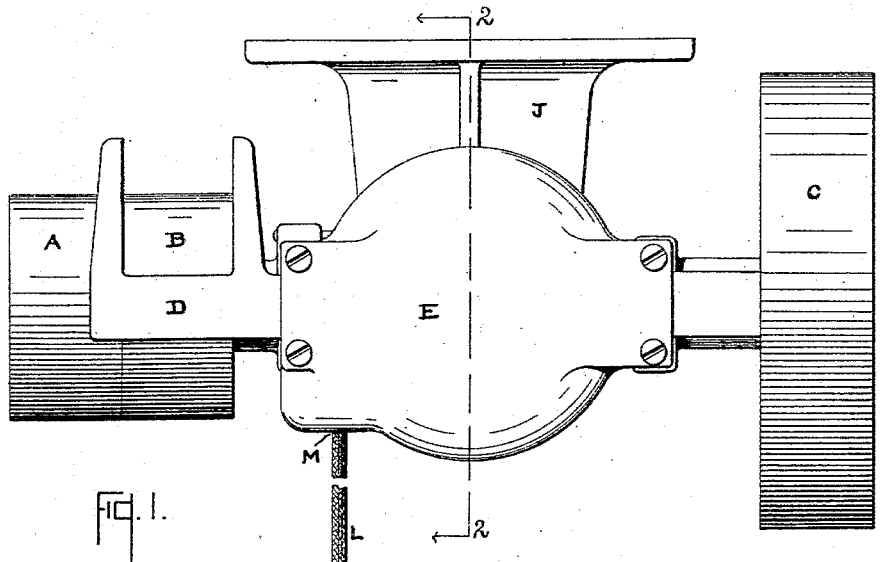
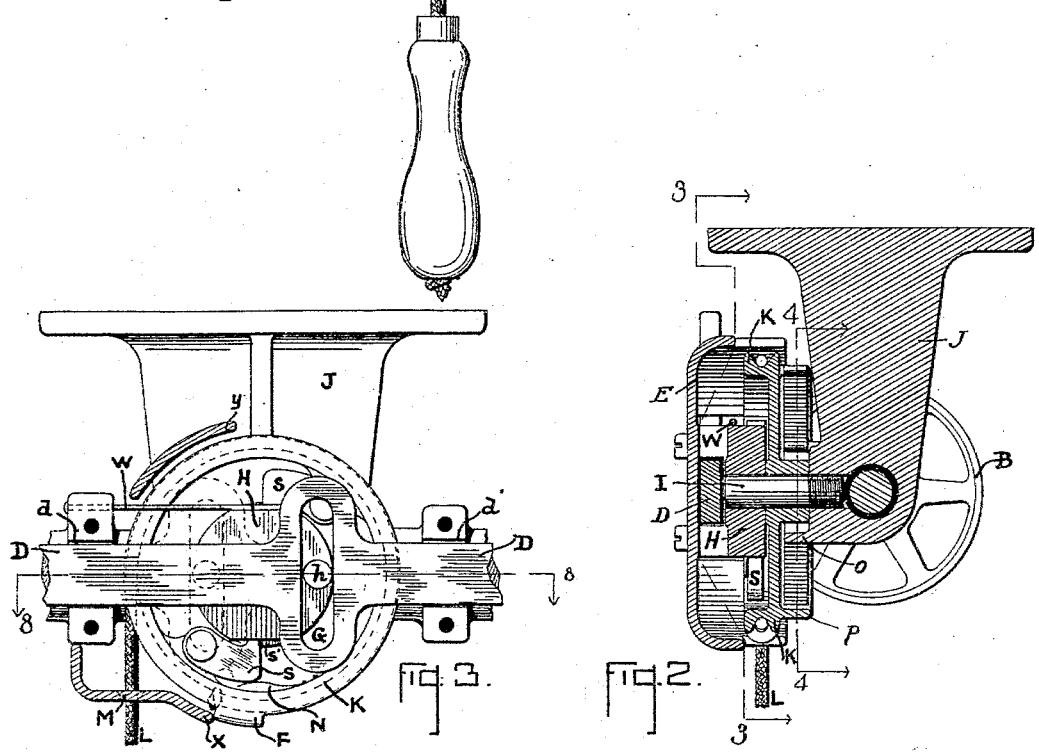
WITNESSES:
Harry J. Garceau
G. Edwin Sawin
INVENTOR:
Fred<sup>k</sup> N. Connet.

(No Model.) 3 Sheets—Sheet 2.

F. N. CONNET.
BELT SHIFTER.

No. 551,365. Patented Dec. 17, 1895.

WITNESSES:
Harry J. Garceau
G. Edwin Sawin

INVENTOR:
Fredk. N. Connet.

(No Model.)   F. N. CONNET.
BELT SHIFTER.

No. 551,365.    Patented Dec. 17, 1895.

WITNESSES:
Harry J. Garceau
G. Edwin Sawin.

INVENTOR:
Fredk. N. Connet

UNITED STATES PATENT OFFICE.

FREDERICK N. CONNET, OF PROVIDENCE, RHODE ISLAND.

BELT-SHIFTER.

SPECIFICATION forming part of Letters Patent No. 551,365, dated December 17, 1895.

Application filed July 6, 1895. Serial No. 555,169. (No model.)

*To all whom it may concern:*

Be it known that I, FREDERICK N. CONNET, of the city and county of Providence and State of Rhode Island, have invented a new and useful Improvement in Belt-Shifters, of which the following, with the accompanying drawings hereby made a part hereof, is a description.

The object of the invention is to furnish an improved apparatus for shifting machine-belts either onto or off from the loose pulley by alternate movements of the same actuating device—that is, for example, if the shifter is actuated by a cord and the belt is on the loose pulley, to start the machine the cord is pulled thereby shifting the belt to the tight pulley, and then if the cord is again pulled in exactly the same manner as at first, the belt is shifted in the opposite direction back to the loose pulley and the machine is stopped. In this way there is no chance for any mistake on the part of the operator at critical moments by getting hold of the wrong cord or by attempting to give the wrong motion to a bar, handle, or other actuating device. I am aware that there are other forms of apparatus accomplishing the same results as my invention; but I regard the one herein described and claimed as better than any heretofore produced.

Figure 8:
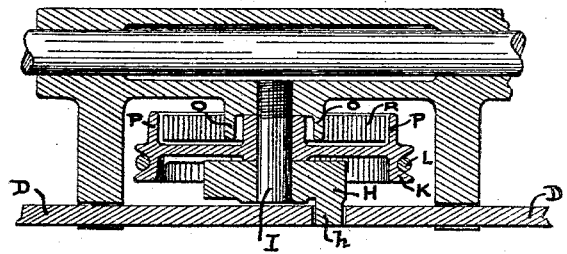
Figure 9:
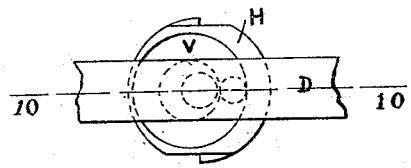
Figure 10:
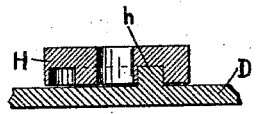
Figure 11:
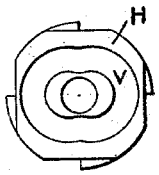

Referring to the drawings, Figure 1 is a general view of my improved belt-shifter as designed for comparatively small sizes, showing the counter-shaft with its three pulleys, A and B being respectively the tight and loose pulleys for the driving-belt and C the pulley to drive the machine with which the belt-shifter is used, and also showing the belt-shifter bar D, all mounted upon a single hanger J. The casing E being shown in place in this figure covers the working parts. Fig. 2 is a transverse sectional view through the middle of Fig. 1 on line 2 2 of that figure; and Fig. 3 is a longitudinal sectional view with the casing E removed and is upon the line 3 3 of Fig. 2. These two latter figures with Fig. 8 serve to show the arrangement of the various working parts when combined together. Figs. 4, 5, 6, and 7 are views of particular parts, which will be described in more detail hereinafter. Fig. 8 is a plan view in section upon line 8 8 of Fig. 3; and Figs. 9, 10, and 11 show modified forms of the same device.

The belt-shifter bar D, carrying properly-constructed fingers to engage the sides of the belt to be shifted, slides in guides at $d\ d'$ of the hanger J, (see Fig. 3,) and in the construction here shown has transversely to its length the slot G, formed in a proper extension of the metal. The shifter-bar D passes transversely across the face and center of a disk H, Fig. 3, and shown in detail in Figs. 5 and 6, mounted upon a spindle I, Fig. 2, carried in the main portion of the hanger, and inserted in the disk H is a pin or spindle $h$, Fig. 3, which passes into the slot G of the shifter-bar. The disk H always turns in the same direction; but it is evident that as the pin or spindle $h$ is moved in its circumferential path by the rotation of the disk H it will move the shifter-bar back and forth. This bar, the disk H, and pin $h$ are so arranged and proportioned with respect to the belt to be shifted that when the pin $h$ is at the farthest point to the right to which it can go, the belt is upon either the tight or loose pulley, and when the point of its path farthest to the left is reached by the pin $h$ the belt is on the opposite pulley.

In Fig. 3 the dotted lines show the second position of the shifter-bar. In the arrangement here shown it is evident that the slot G must be sufficiently long to permit of the entire revolution of the pin $h$. It will thus be seen that each half-rotation of the disk H will serve to throw the belt upon the opposite pulley to that upon which it was before. Further, the points at which the pin $h$ stops each time is a dead-center as respects any pressure by the belt upon the bar D. I do not however ordinarily depend wholly upon the disk H preserving this dead-center to prevent any further shifting of the belt, but employ other means to assist in preserving it, as hereinafter described.

In order to rotate the disk H through one half-revolution for the purpose specified, there is mounted as I have constructed it upon the same central spindle I a second disk or rope-wheel K, (shown as a separate feature in Fig. 7,) grooved upon its periphery for the rope L, by which it is operated. One end of the rope passes through the stop F upon the wheel K and is knotted upon the other side, as shown in dotted lines in Fig. 3, and then after passing around a portion of the wheel K passes through a hole at M in the casing E, which serves as a guide to always keep it upon the wheel K, and hangs down within reach of the operator. This casing E is made with a flange extending back from its face sufficiently around one side and near to the periphery of the wheel K to meet the stop F upon the wheel at two points—viz., x and y, Fig. 3—and yet leave a free passage for it between these points in one direction. They are so placed as to permit the wheel K to pass through a little more than one half-rotation. Around the spindle I and cast upon the hanger is a circular flange O, Figs. 4 and 8, with a slot O' through it, and upon the disk or rope-wheel K is cast a similar circular flange P with a similar slot P', but of a larger diameter than that upon the hanger. Between these flanges is coiled a spring R, Fig. 4, one end of which is turned over the edge of the inner flange on the hanger through the slot O', and the other end over the edge of the other flange on the wheel K through the slot P'. This spring is arranged to carry the disk or wheel K back to its original position whenever the cord L is let go of. Thus the stop F ordinarily rests against the flange of the casing at x, Fig. 3, and when the cord L is pulled as far as possible the wheel K will make about one half-rotation and the stop F will come into contact with the other end of the flange at y. Now if the operator lets go the cord the spring will carry the disk K back to its original position ready for the cord to be pulled again. It only remains to transmit this motion of the half-rotation of the wheel K, so as to also turn the disk H one-half way round each time the cord is pulled. This may be done in various ways. The means I have taken to accomplish it is by mounting one or more pawls S S upon the rope-wheel K and causing them by gravity or by springs to catch in corresponding notches S' S', in the periphery of the disk H, Figs. 5 and 6. The pawl shown in the drawings at the top will engage in its catch by gravity. That at the bottom may have a spring to press it into contact, but this latter pawl is designed rather for the purpose of insuring the completion of the half-turn should the first or upper pawl drop from its catch in any way before completing the full half-turn, and for this purpose it would at such a time be above the center, so that it will also fall by gravity behind its notch. To be more sure of this the second or lower pawl might be placed only about one-third of the circumference behind the other, instead of opposite it. In any event no spring to keep the pawls in contact with the disk H is absolutely necessary, though one is shown in the drawings at N behind the lower pawl.

It is stated above that the wheel K is allowed a movement of a little more than one-half of a complete rotation. This is for the purpose of insuring that the pawls pass back of their catches, and is accomplished by the position of the lower edge of the flange of the casing, as at x.

Figure 4:
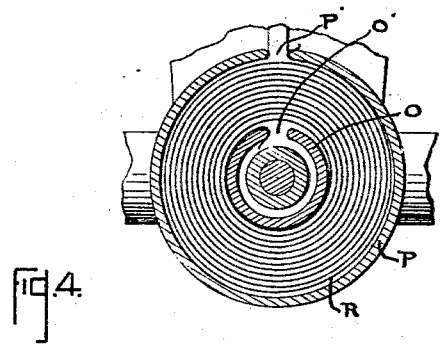
Figure 5:
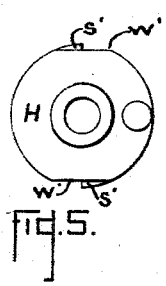
Figure 6:
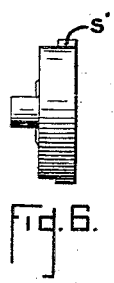
Figure 7:
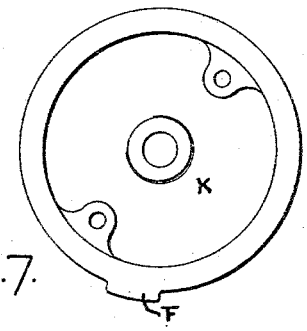

Not to depend entirely upon the disk H retaining its position of a dead-center at either end of the movement of the belt-shifter bar D, I have added a flat spring W, Fig. 3, fastened fixedly at one end and bearing at its other end upon either one of two flat surfaces W' W', Figs. 5 and 6, formed upon a portion of the periphery of the disk H. This spring will alternately bear upon each of these two flat surfaces, they being opposite each other. There are evidently various other ways of accomplishing this result—as, for example, by a stationary pawl and suitable notches for it to catch in.

Figs. 9, 10, and 11 show modified arrangements of essentially the same idea. In these the shifter-bar D carries the stud or pin h and there is cut or otherwise constructed upon the face of the disk H a groove V, which forms a circular cam, as shown in Fig. 9, into which the pin h is inserted, it being held therein by proper bearing-surfaces behind the bar D. (Not shown.) In Fig. 11 this cam-groove is shown in a double cam. In this latter case the extent of the movement given to the wheel K or other means used to give the rotary motion to the disk H must be modified to correspond with the cams. Thus in the arrangement shown in Fig. 11 the amount of rotation to be given to disk H is one-fourth instead of one-half of a complete rotation, and if any more complicated form of cam is used the rotation must be further modified to correspond.

I claim as my invention—

1. A belt shifting apparatus consisting of a shifting-bar, a rotary disk, a device attached to said disk and connected to the shifting-bar to give it motion, means for giving rotary motion to the disk through a fractional part of a complete rotation and always in the same direction, the foregoing combination being so proportioned and arranged that each fractional rotation of the disk will move the shifting-bar from one extreme of its limit of motion to the other and alternately in opposite directions, and a spring to return to its normal position said means for rotating the disk, substantially as described.

2. A belt shifting apparatus consisting of a shifting bar having a slot transversely of its length, a rotary disk, a stud carried by said disk and extending into the slot of the bar, rotative means for moving said disk through part of a complete rotation at a time and always in the same direction, and a spring to return to its normal position said means for rotating the disk, substantially as described.

3. A belt shifting apparatus consisting of a shifting bar, a rotary disk connected with said bar, a second disk having a rotary motion through one-half of a complete rotation, means for rotating said second disk through its one-half rotation and a spring to return this second disk to its original position, and one or more pawls and corresponding catches carried upon the two disks to communicate the motion in one direction of said second disk to the first mentioned disk, substantially as described.

4. A belt shifting apparatus consisting of a shifting bar having a slot transversely of its length, a rotary disk, means for preventing the rotation of this disk except when intentionally caused, a stud carried by said disk and extending into the slot of the bar, a rotative means for moving said disk through part of a complete rotation at a time and always in the same direction, and a spring to return to its normal position said means for rotating the disk, substantially as described.

5. A belt shifting apparatus consisting of a shifting bar, a rotary disk connected with said bar and having one or more flat surfaces, a second disk having a rotary motion through one-half of a complete rotation, means for rotating said second disk through its one-half rotation and a spring to return this second disk to its normal position, one or more pawls and corresponding catches carried upon the two disks to communicate the motion in one direction of said second disk to the first mentioned disk, and one or more springs bearing upon the flat surface or surfaces of the first mentioned disk to prevent it from rotating except when intentionally caused to do so, substantially as described.

FREDK. N. CONNET.

Witnesses:
H. J. BURROUGH,
WM. R. TILLINGHAST.